United States Patent
Kim et al.

(10) Patent No.: US 11,159,275 B2
(45) Date of Patent: Oct. 26, 2021

(54) METHOD FOR PERFORMING HARQ FOR V2X COMMUNICATION IN WIRELESS COMMUNICATION SYSTEM AND APPARATUS THEREFOR

(71) Applicant: LG Electronics Inc., Seoul (KR)

(72) Inventors: Youngtae Kim, Seoul (KR); Hanbyul Seo, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 239 days.

(21) Appl. No.: 16/344,616

(22) PCT Filed: Oct. 25, 2017

(86) PCT No.: PCT/KR2017/011805
§ 371 (c)(1),
(2) Date: Apr. 24, 2019

(87) PCT Pub. No.: WO2018/080151
PCT Pub. Date: May 3, 2018

(65) Prior Publication Data
US 2020/0067650 A1 Feb. 27, 2020

Related U.S. Application Data

(60) Provisional application No. 62/412,297, filed on Oct. 25, 2016.

(51) Int. Cl.
*H04L 1/18* (2006.01)
*H04L 5/00* (2006.01)
*H04W 72/04* (2009.01)

(52) U.S. Cl.
CPC .......... *H04L 1/1812* (2013.01); *H04L 5/001* (2013.01); *H04L 5/0048* (2013.01); *H04L 5/0055* (2013.01); *H04W 72/042* (2013.01)

(58) Field of Classification Search
CPC ..... H04L 1/1812; H04L 5/001; H04L 5/0048; H04L 5/0055; H04W 72/042
See application file for complete search history.

(56) References Cited

U.S. PATENT DOCUMENTS

| 9,237,546 B1 * | 1/2016 | Zhang .................. H04W 4/029 |
| 2009/0171555 A1 | 7/2009 | Hyde et al. |

(Continued)

OTHER PUBLICATIONS

Ericsson, "Antenna pattern at UE/RSU in NR eV2X", 3GPP TSG RAN WG1 Meeting #86bis, Oct. 10-14, 2016, R1-1609703.

(Continued)

*Primary Examiner* — Luat Phung
(74) *Attorney, Agent, or Firm* — Dentons US LLP

(57) ABSTRACT

The present invention relates to a method and an apparatus for allowing a vehicle-to-everything (V2X) reception terminal to perform a hybrid automatic repeat request (HARQ) in a wireless communication system. More specifically, the method comprises the steps of: receiving a V2X signal which is broadcasted from a V2X transmission terminal; and transmitting, to the V2X transmission terminal, an acknowledgement/negative-acknowledgement (ACK/NACK) for the broadcasted V2X signal, wherein the ACK/NACK is configured to identify a location area, which corresponds to a location of a V2X reception terminal, among a plurality of location areas divided for ACK/NACK transmission on the basis of a location of the V2X transmission terminal.

17 Claims, 12 Drawing Sheets

(56) References Cited

U.S. PATENT DOCUMENTS

| | | |
|---|---|---|
| 2012/0083283 A1 | 4/2012 | Phan et al. |
| 2015/0081201 A1 | 3/2015 | Rubin et al. |
| 2015/0181553 A1* | 6/2015 | Segev ................ H04W 64/003 |
| | | 455/456.1 |
| 2015/0195827 A1 | 7/2015 | Feng et al. |
| 2016/0285935 A1 | 9/2016 | Wu et al. |
| 2018/0083730 A1* | 3/2018 | Gulati .................. H04L 1/0019 |

OTHER PUBLICATIONS

International Search Report from PCT/KR2017/011805, dated Jan. 23, 2018.
Written Opinion of the ISA from PCT/KR2017/011805, dated Jan. 23, 2018.
CATT, "Discussion on capacity enhancement of broadcast V2X services", 3GPP TSG RAN WG2 Meeting #93bis, Apr. 11-15, 2016, R2-162220, XP051082008.
LG Electronics, "Discussion on UE feedback for DL multicast/broadcast", 3GPP TSG RAN WG1 Meeting #85, May 23-27, 2016, R1-164537, XP051096398.

* cited by examiner

FIG. 2
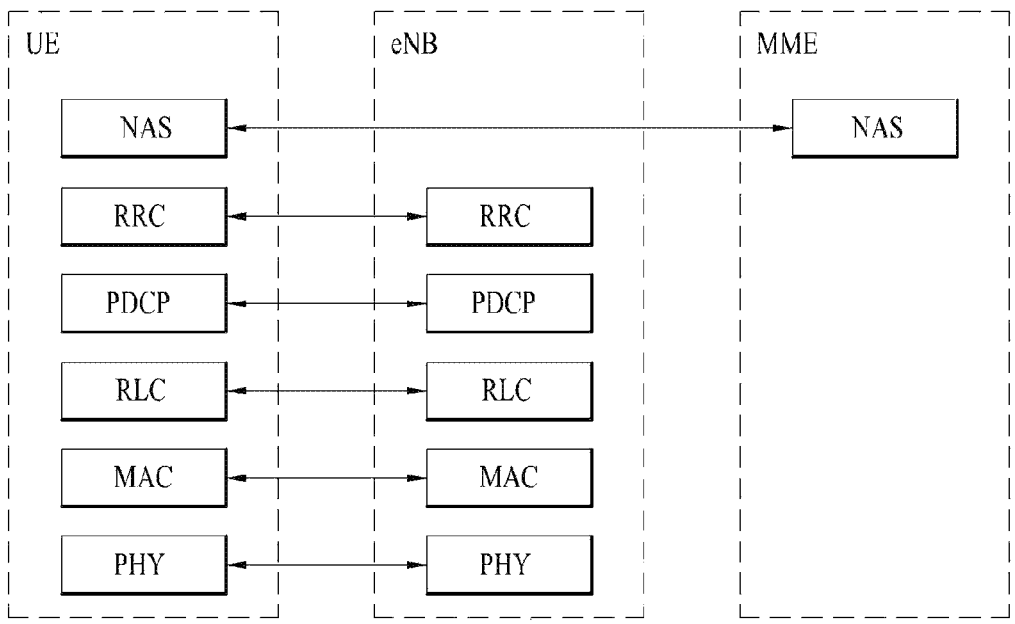
(a) Control plane protocol stack
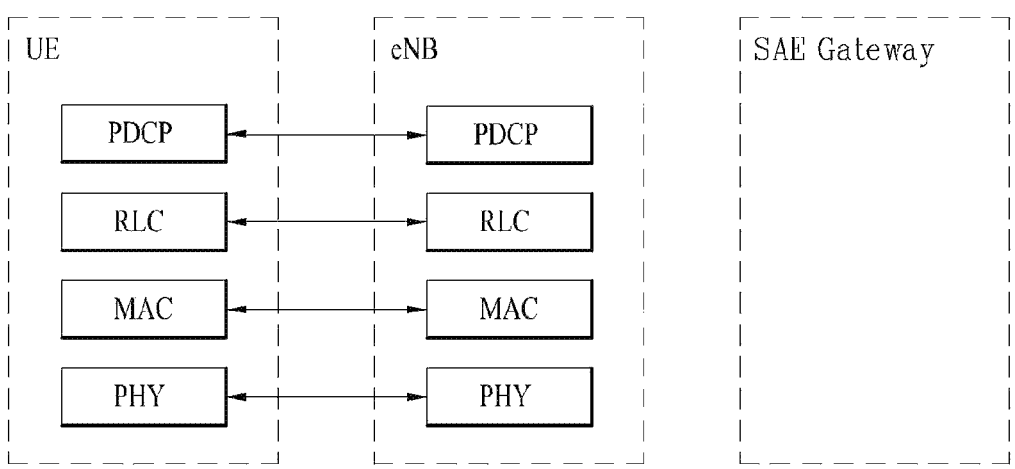
(b) User plane protocol stack

FIG. 8
(a)
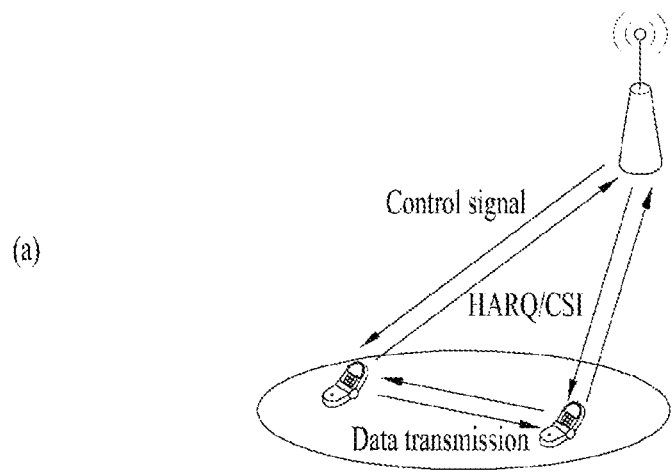
(b)
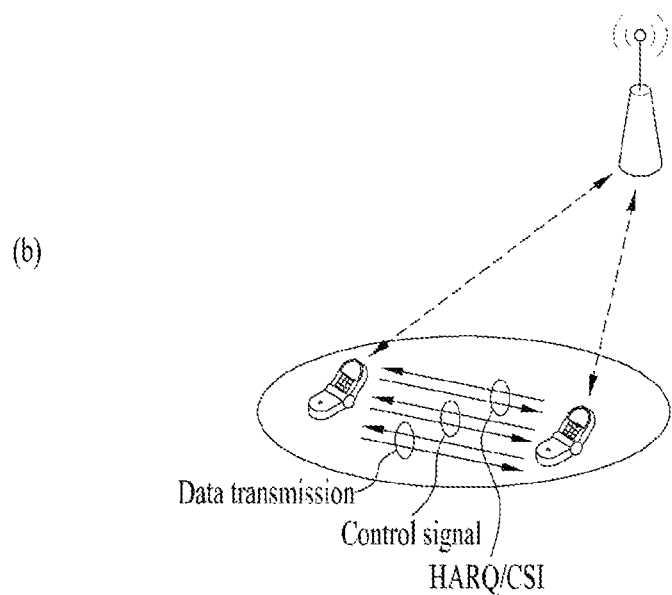

METHOD FOR PERFORMING HARQ FOR V2X COMMUNICATION IN WIRELESS COMMUNICATION SYSTEM AND APPARATUS THEREFOR

This application is a National Stage Entry of International Application No. PCT/KR2017/011805 filed Oct. 25, 2017, which claims priority to U.S. Provisional Application No. 62/412,297 filed Oct. 25, 2016, all of which are incorporated herein by reference.

TECHNICAL FIELD

The present disclosure relates to a wireless communication system, and more particularly, to a method of performing Hybrid Automatic Repeat Request (HARQ) for Vehicle-to-Everything (V2X) communication in a wireless communication system and apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.25, 2.5, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Task

Based on the above discussion, the present disclosure proposes a method of performing HARQ for V2X communication in a wireless communication system and apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

In an aspect of the present disclosure, provided is a method of performing Hybrid Automatic Repeat Request (HARQ) by a Vehicle-to-Everything (V2X) receiving User Equipment (UE) in a wireless communication system. The method may include: receiving a V2X signal broadcast from a V2X transmitting UE; and transmitting an Acknowledgement/Negative-Acknowledgement (ACK/NACK) for the broadcast V2X signal to the V2X transmitting UE. The ACK/NACK may be configured to be able to identify a location area corresponding to a location of the V2X receiving UE from among multiple location areas distinguished for ACK/NACK transmission based on a location of the V2X transmitting UE.

Additionally, the ACK/NACK may be transmitted in a specific resource region corresponding to the location area corresponding to the location of the V2X receiving UE among resource regions respectively corresponding to the multiple location areas distinguished for the ACK/NACK transmission.

Additionally, the ACK/NACK may be transmitted using a specific ACK/NACK sequence corresponding to the location area corresponding to the location of the V2X receiving UE among ACK/NACK sequences respectively corresponding to the multiple location areas distinguished for the ACK/NACK transmission.

Additionally, the V2X signal may be transmitted via at least two ports configured in the V2X transmitting UE. The V2X signal may be precoded based on a rank-1 codebook, and a channel thereof may be measured. The ACK/NACK may be transmitted on an ACK/NACK resource group corresponding to at least one codeword that is selected from the rank-1 codebook based on a channel measurement value.

Additionally, the V2X signal may include data and a reference signal. The data may be transmitted via at least two first ports configured in the V2X transmitting UE, and the reference signal may be transmitted via a second port different from the first ports. The data may be precoded based on a rank-1 codebook associated with the second port, and a channel thereof may be measured. The ACK/NACK may be transmitted on an ACK/NACK resource group corresponding to at least one codeword that is selected from the rank-1 codebook based on a channel measurement value.

Additionally, the V2X signal may be transmitted through beam sweeping where multiple beams are used, and the ACK/NACK may be transmitted on an ACK/NACK resource group corresponding to a specific beam selected from among the multiple beams based on channel power.

Additionally, the method may further include: receiving beam information including a reference signal for at least one beam from the V2X transmitting UE; and feeding a best beam back to the V2X transmitting UE based on the reference signal for the at least one beam. In this case, the ACK/NACK may be transmitted on an ACK/NAKC resource group associated with the best beam.

Additionally, the method may further include: receiving reference signals for a predetermined number of ports; and determining the location of the V2X receiving UE with respect to the V2X transmitting UE based on the reference signals.

Additionally, the V2X signal may be transmitted using a horizontal domain antenna and a vertical domain antenna configured in the V2X transmitting UE, and the ACK/NACK may be transmitted in an ACK/NACK resource region associated with a codeword corresponding to either or both of the horizontal domain antenna and the vertical domain antenna.

In another aspect of the present disclosure, provided is a Vehicle-to-Everything (V2X) receiving User Equipment (UE) for performing Hybrid Automatic Repeat Request (HARQ) in a wireless communication system. The V2X receiving UE may include: a radio frequency unit; and a processor, the processor configured to: receive a V2X signal broadcast from a V2X transmitting UE; and transmit an Acknowledgement/Negative-Acknowledgement (ACK/NACK) for the broadcast V2X signal to the V2X transmitting UE. The ACK/NACK may be configured to be able to identify a location area corresponding to a location of the V2X receiving UE from among multiple location areas distinguished for ACK/NACK transmission based on a location of the V2X transmitting UE.

Advantageous Effects

According to the present disclosure, HARQ for V2X communication can be efficiently performed in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 illustrates control plane and user plane structures of a radio interface protocol between a UE and an E-UTRAN on the basis of the 3GPP wireless access network standard.

FIG. 8 is a reference diagram to describe D2D (UE-to-UE) communication.

BEST MODE FOR INVENTION

Figure 1:
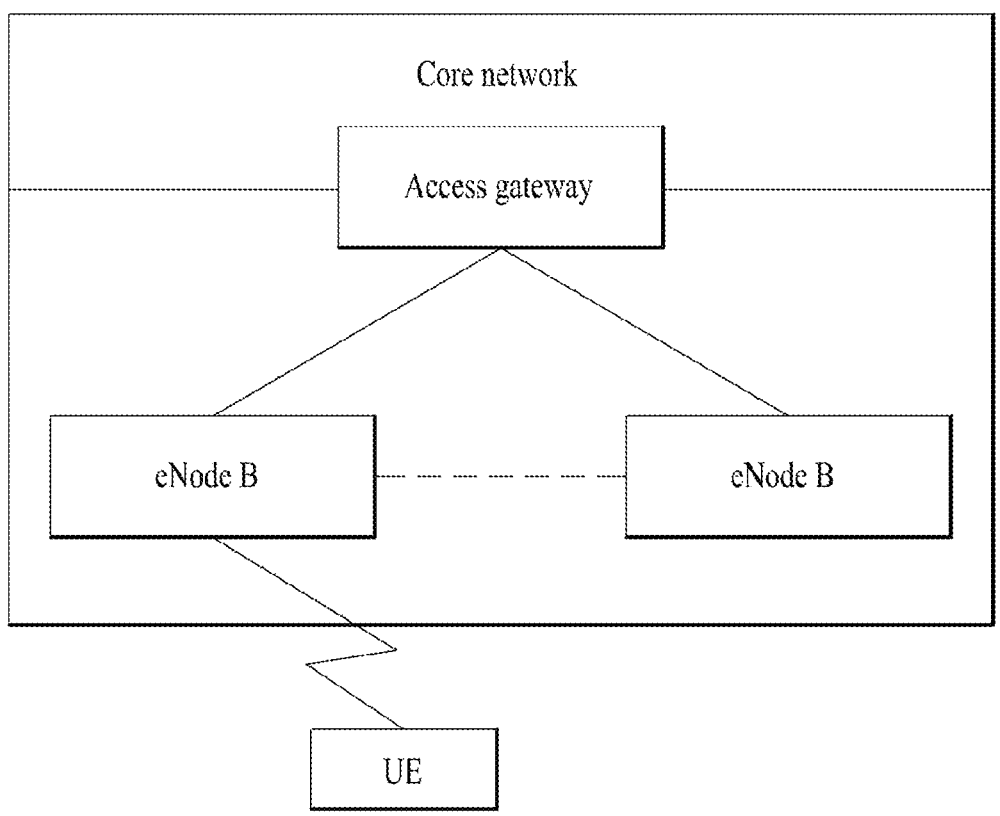
FIG. 1 schematically illustrates an E-UMTS network structure as an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts 01-DMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel.

The physical layer is connected to a medium access control (MAC) layer via a transport channel, wherein the medium access control layer is located above the physical layer. Data are transferred between the medium access control layer and the physical layer via the transport channel Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
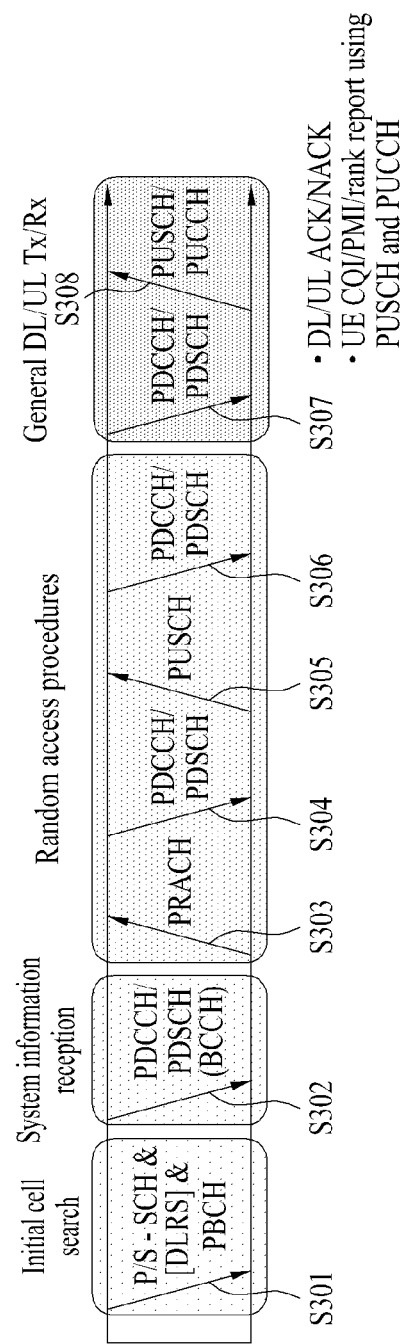
FIG. 3 illustrates physical channels used in a 3GPP system and a general signal transmission method using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
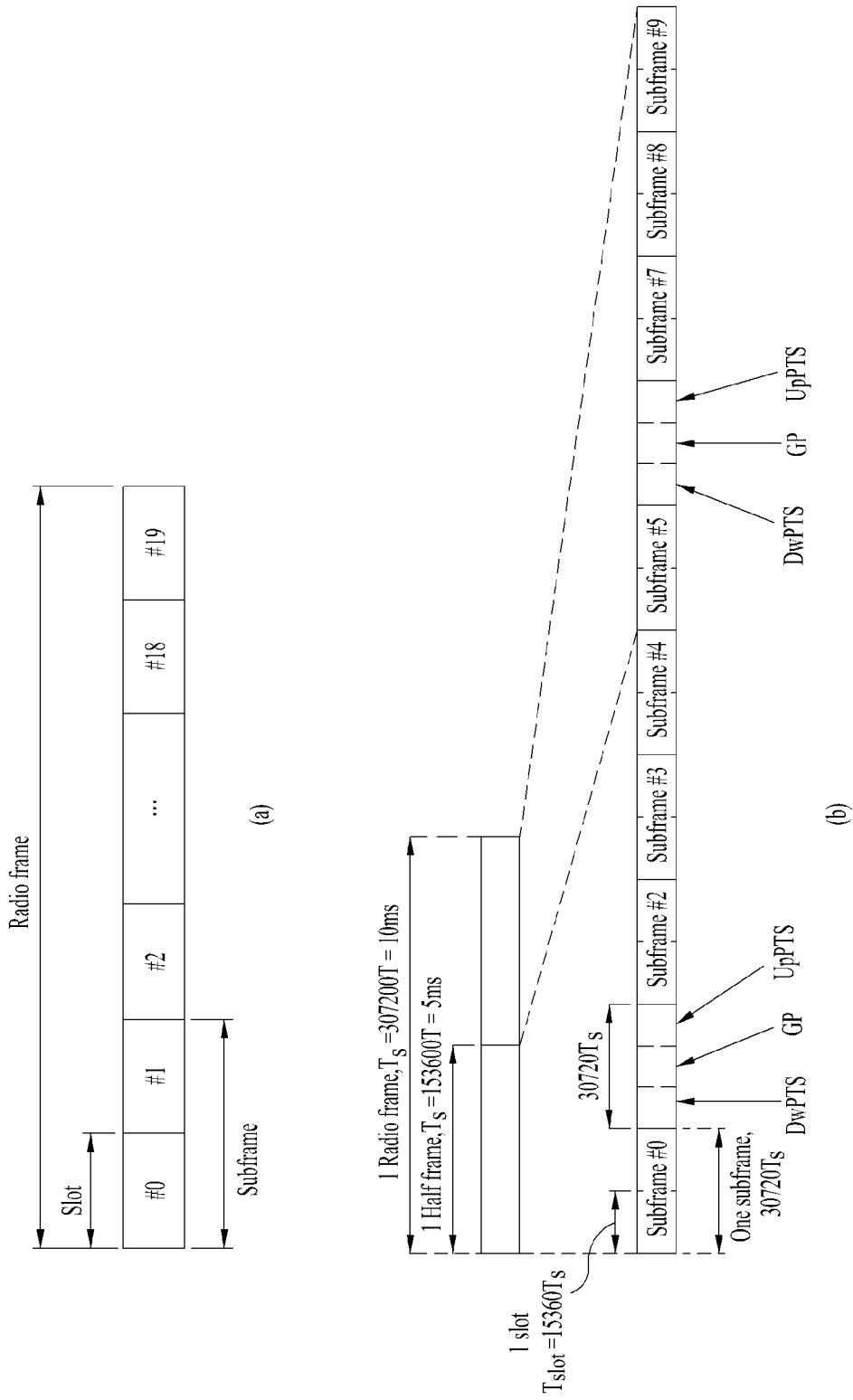
FIG. 4 illustrates a radio frame structure used in LTE.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
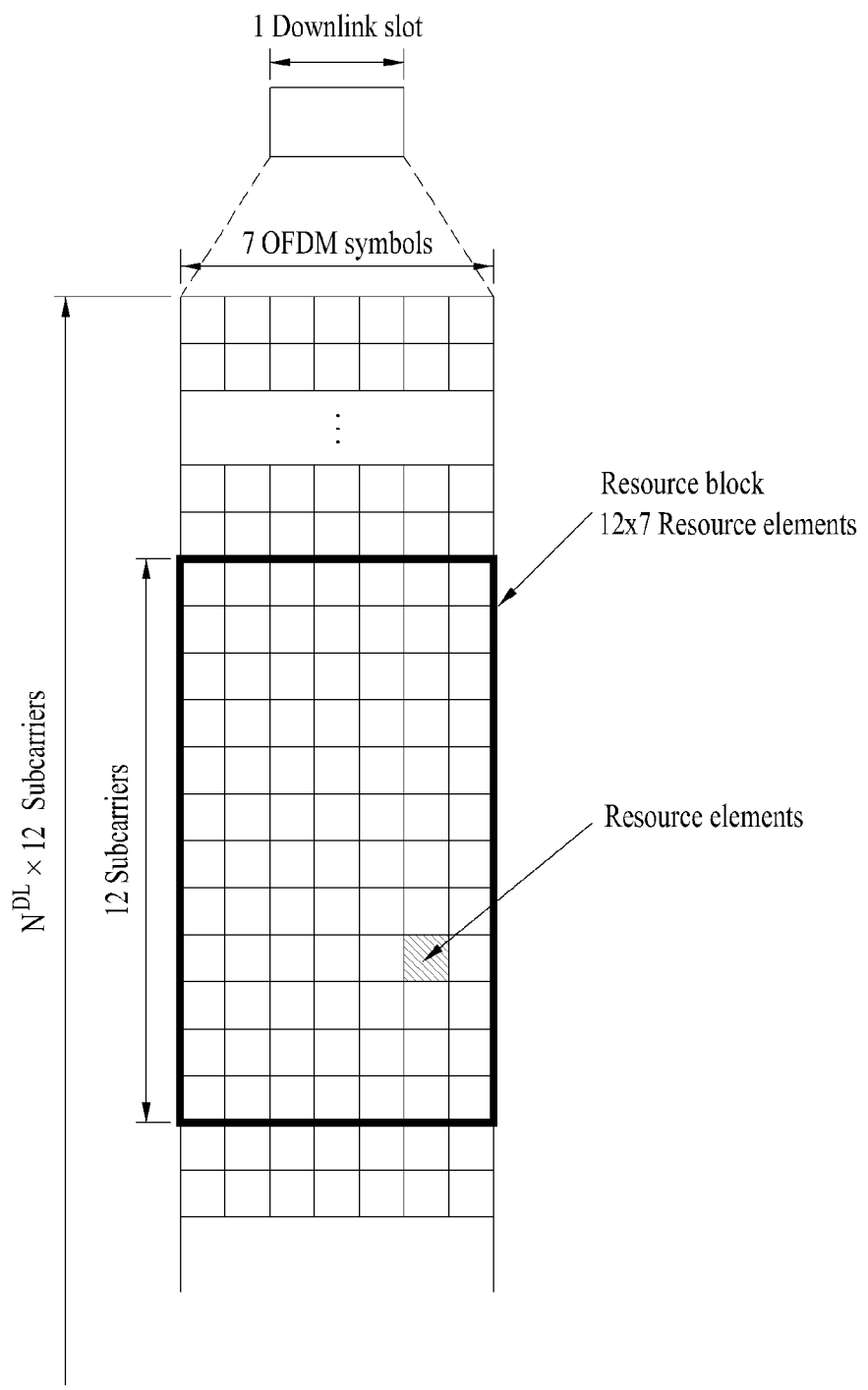
FIG. 5 illustrates a resource grid for a downlink slot.

FIG. 5 illustrates a resource grid for a downlink slot.

Referring to FIG. 5, a DL slot includes $N\_symb^{DL}$ OFDM symbols in a time domain and $N\_RB^{DL}$ resource blocks in a frequency domain. Since each of the resource blocks includes $N\_SC^{RB}$ subcarriers, the DL slot includes $N\_RB^{DL} \times N\_SC^{RB}$ subcarriers in the frequency domain. Although FIG. 5 shows an example in which the DL slot includes 7 OFDM symbols and the resource block includes 12 subcarriers, the present invention is not limited thereto. For instance, the number of OFDM symbols included in the DL slot can vary depending to a length of a cyclic prefix (CP).

Each element on a resource grid is referred to as a resource element (RE) and a single resource element is indicated by one OFDM symbol index and one subcarrier index. A single RB is configured with N_symb^DL× N_SC^RB resource elements. The number (N_RB^DL) of resource blocks included in the DL slot depends on a DL transmission bandwidth configured in a cell.

Figure 6:
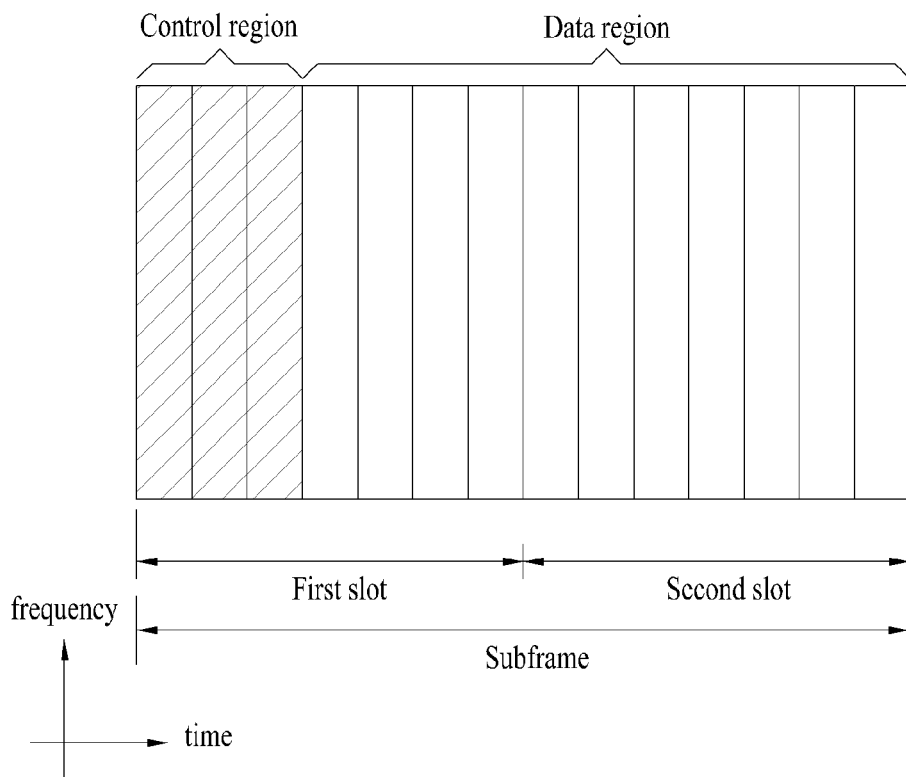
FIG. 6 illustrates a structure of a downlink radio frame used in an LTE system.

FIG. 6 illustrates a structure of a downlink radio frame.

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a user equipment or a user equipment group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual user equipments in a user equipment group, a Tx power control command, activation indication information of a VoIP (voice over IP) and the like. A plurality of PDCCHs may be transmitted in a control region. A user equipment can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A base station determines the PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or a purpose of use. For instance, if a PDCCH is provided for a specific user equipment, CRC may be masked with an identifier (e.g., C-RNTI (cell-RNTI)) of the corresponding user equipment. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
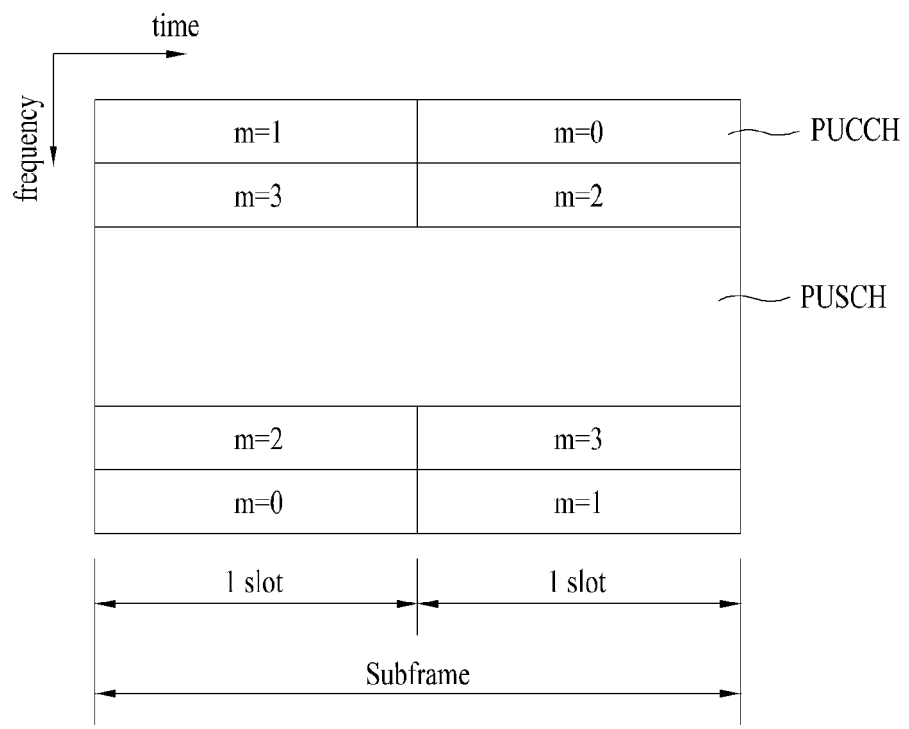
FIG. 7 illustrates a structure of an uplink radio frame used in an LTE system.

FIG. 7 illustrates a structure of an uplink subframe used in an LTE system.

Referring to FIG. 7, an uplink subframe includes a plurality (e.g., 2 slots) of slots. Each of the slots may include a different number of SC-FDMA symbols depending on a length of CP. The UL subframe may be divided into a data region and a control region in the frequency domain. The data region includes a PUSCH and is used to transmit such a data signal as audio and the like. The control region includes a PUCCH and is used to transmit UCI (uplink control information). The PUCCH includes an RB pair located at both ends of the data region on a frequency axis and is hopped on a slot boundary.

The PUCCH can be used to transmit the following control information.

SR (scheduling request): This is information used to request a UL-SCH resource and is transmitted using an OOK (on-off keying) scheme.

HARQ ACK/NACK: This is a response signal in response to a DL data packet on a PDSCH and indicates whether the DL data packet has been successfully received. 1-bit ACK/NACK is transmitted as a response to a single downlink codeword and 2-bit ACK/NACK is transmitted as a response to two downlink codewords.

CSI (channel state information): This is feedback information on a downlink channel. The CSI includes a channel quality indicator (CQI). MIMO (multiple input multiple output) related feedback information includes a rank indicator (RI), a precoding matrix indicator (PMI), a precoding type indicator (PTI) and the like. 20-bit is used in each subframe.

The amount of control information (UCI) that a user equipment can transmit in a subframe depends on the number of SC-FDMA symbols available for transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. The reference signal is used for coherent detection of a PUCCH.

Hereinafter, D2D (UE-to-UE) communication will be described.

A D2D communication scheme can be mainly classified as a scheme supported by a network/coordination station (e.g., base station) and a scheme not supported by the network/coordination station.

Referring to FIG. 8, FIG. 8(a) illustrates a scheme in which the network/coordination station intervenes in transmission and reception of control signals (e.g., grant message), HARQ, channel state information, etc. and user equipments that perform D2D communication transmit and receive data only. On the other hand, FIG. 8(b) illustrates a scheme in which the network provides minimum information (e.g., D2D connection information available in a corresponding cell) only but the user equipments that perform D2D communication establish links to transmit and receive data.

Figure 9:
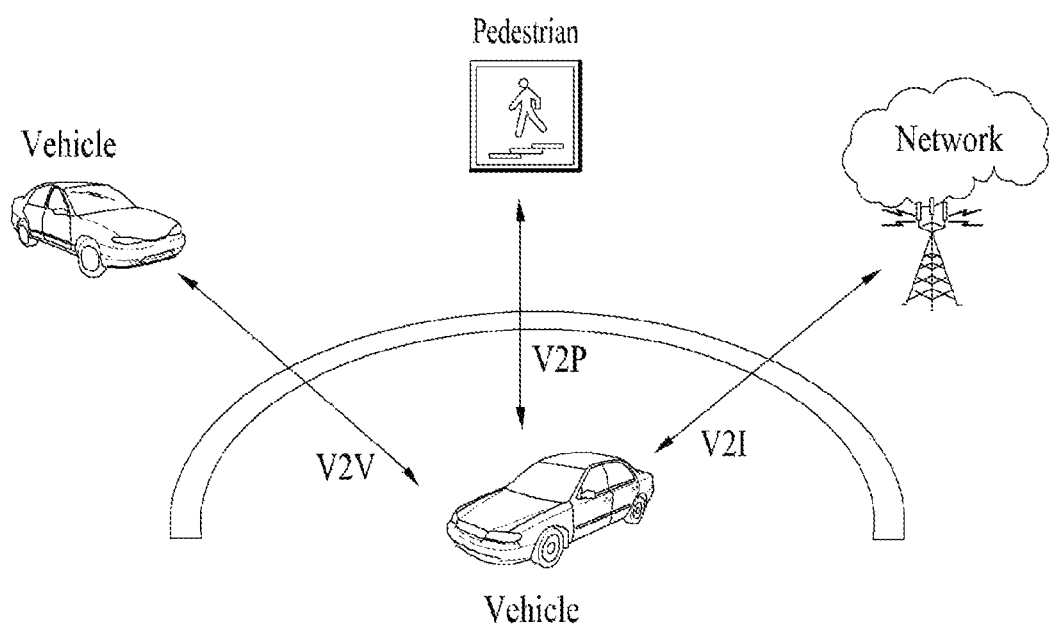
FIG. 9 is a reference diagram to describe a V2V scenario.

FIG. 9 is a diagram illustrating a V2X (vehicle to everything) communication environment.

If a vehicle accident occurs, many lives are lost, and serious property damage is caused. Thus, the demand for a technology capable of securing safety of pedestrians as well as safety of people in a vehicle has been increased. In addition, a technology based on hardware and software dedicated to the vehicle has been grafted onto the vehicle.

Recently, the LTE-based V2X (vehicle-to-everything) communication technology, which has been evolved from 3GPP, reflects the tendency in which the information technology (IT) is grafted onto the vehicle. A connectivity function is applied to some kinds of vehicles, and efforts are continuously made to research and develop vehicle-to-vehicle (V2V) communication, vehicle-to-infrastructure (V2I) communication, vehicle-to-pedestrian (V2P) communication, and vehicle-to-network (V2N) communication with the evolution of communication functions.

According to V2X communication, a vehicle consistently broadcasts information on its own locations, speeds, directions, etc. After receiving the broadcasted information, a nearby vehicle utilizes the information for accident prevention by recognizing movements of other adjacent vehicles.

That is, in a similar manner that an individual person carries a user equipment such as a smartphone, a smartwatch or the like, a specific type of user equipment (UE) can be installed in each vehicle. Here, a UE installed in a vehicle means a device that actually receives communication services from a communication network. For example, the UE installed in the vehicle can be accessed to an eNB in E-UTRAN and provided with communication services.

However, there are various items that should be considered for a process for implementing V2X communication in a vehicle. This is because astronomical costs are required for the installation of traffic safety facilities such as a V2X base station and the like. That is, to support V2X communication on all roads where the vehicle can move, it is necessary to install hundreds or thousands of V2X base stations or more. Moreover, since each network node accesses the Internet or a centralized control server using a wired network basically for stable communication with a server, installation and maintenance costs for the wired network are also high.

Hereinafter, resource allocation for performing V2X communication in the present invention is described. Although the present invention is described by being limited to a V2X scenario for clarity of the description, the present invention is applicable to other communication systems such as Device-to-Device (D2D) communication.

Figure 10:
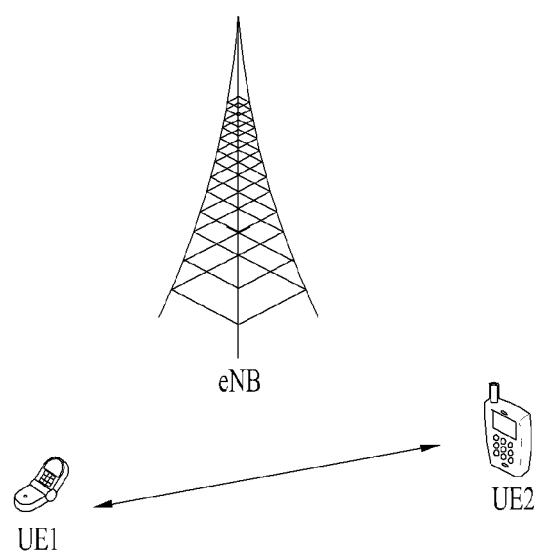
FIG. 10 and FIG. 11 are reference diagrams to describe a resource pool on a D2D scenario.

FIG. 10 is a reference diagram to describe UE-to-UE direct communication. When a UE performs communication with another UE using a direct wireless channel, as shown in FIG. 10, the present invention proposes a method of determining a resource to use for communication. This can be named UE-to-UE direct signal transmission/reception or Device-to-Device (D2D) communication, and further named a sidelink to be distinguished from Downlink (DL) and Uplink (UL) of the existing cellular communication. Furthermore, communication among multiple devices may be named Vehicle-to-Vehicle (V2V) communication in association with vehicles. Hence, although a UE means a user's UE (or car), if a network equipment such as an eNB transmits/receives a signal according to a UE-to-UE communication methodology, the network equipment can be regarded as a sort of UE to which the present invention is applicable. Moreover, an eNB can receive a D2D signal transmitted by a UE. Furthermore, a signal transmitting/receiving method of a UE designed for D2D transmission is applicable to an operation for a UE to transmit data to an eNB.

In the following description, UE1 may operate in a manner of selecting a resource unit corresponding to a specific resource from a resource pool meaning a set of a series of resources and transmitting a D2D signal using the corresponding resource unit. UE2 that is an Rx UE may receive a configuration of a resource pool for the UE1 to transmit a D2D signal and detect a signal of the UE1 within the corresponding resource pool. Here, if the UE1 is in a connection range of a base station, the UE1 can be informed of the resource pool by the base station. If the UE1 is out of the connection range of the base station, the UE1 may be informed of the resource pool by another UE or the resource pool may be determined as a previously determined resource. Generally, a resource pool is configured in a plurality of resource units. Each UE may select a single or a plurality of resource units and use the selected resource unit(s) for D2D signal transmission of its own.

Figure 11:
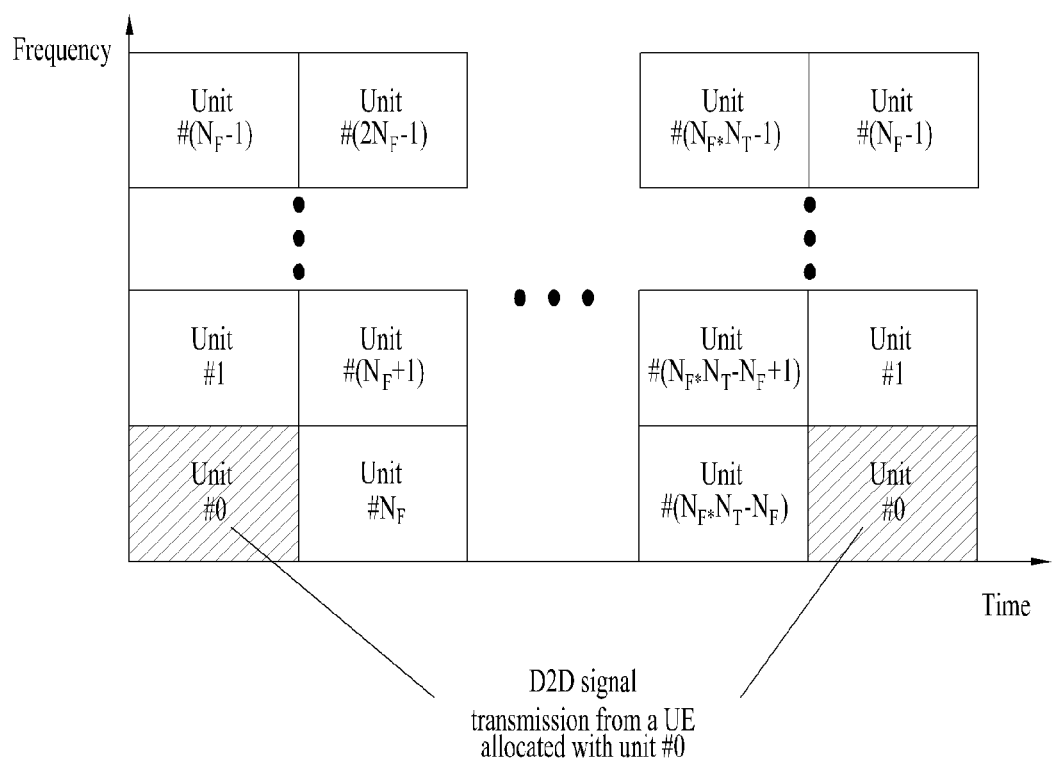

FIG. 11 shows one example of a configuration of resource unit. FIG. 11 illustrates a case that total NF*NT resource units are defined in a manner of dividing a full frequency resource into NF units and dividing a full time resource into NT units. In FIG. 11, a corresponding resource pool is repeated every NT subframes. Typically, as shown in FIG. 11, a single resource unit may appear in a manner of being repeated periodically. Or, an index of a physical resource unit, to which one logical resource unit is mapped to obtain a diversity effect in a time or frequency dimension, may change in a predetermined pattern according to a time. In such a resource unit structure, a resource pool may mean a set of resource units usable for a transmission by a UE intending to transmit a D2D signal.

Furthermore, a resource pool can be subdivided into various types. First of all, a resource pool can be divided according to a content of a transmitted D2D signal in each resource pool. For example, a content of a D2D signal can be classified as follows. And, a separate resource pool may be configured for each content.

Scheduling Assignment (SA) (or sidelink control channel): Signal including information such as a location of a resource used for transmission of a following D2D data channel by each transmitting (Tx) UE, a Modulation and Coding Scheme (MCS) required for demodulation of a data channel, an MIMO transmission methodology and the like. Such an SA signal can be transmitted on the same resource unit by being multiplexed with D2D data. In this case, an SA resource pool may mean a resource pool configured with a resource on which an SA is transmitted by being multiplexed with D2D data.

D2D data channel (sidelink shared channel): A resource pool configured with a resource used in transmitting user data by a Tx UE using a resource designated through SA. If a transmission on the same resource unit by being multiplexed with D2D data is possible, only a D2D data channel of a type except SA information is transmitted in a resource pool for the D2D data channel. So to speak, a resource element used in transmitting SA information on an individual resource unit within an SA resource pool is still used to transmit D2D data in a D2D data channel resource pool.

Discovery message (or sidelink discovery channel): A resource pool for a message through which a Tx UE enables an adjacent UE to discover the Tx UE itself by transmitting information such as an ID of the Tx UE and the like.

Synchronization signal/channel (or, sidelink synchronization signal, sidelink broadcast channel): A resource pool for a signal/channel to achieve an object that a Tx UE transmits a synchronization signal and information related to synchronization to enable an Rx (receiving) UE to match up time/frequency synchronization with that of the Tx UE.

Although SA and data may be use a resource pool separated on a subframe, if a UE can simultaneously transmit SA and data in a single frame, two types of resource pools can be configured in the same subframe.

Moreover, in case that the aforementioned D2D signal content is identical, a different resource pool is usable according to a transmission/reception attribute of the D2D signal. For example, despite the same D2D data channel or discovery message, it can be divided into a different resource pool again depending on a transmission timing determining methodology (whether a D2D signal is transmitted at a reception timing of a synchronization reference signal, whether a D2D signal is transmitted by applying a constant timing advance at a repletion timing of a synchronization reference signal, etc.), a resource allocation methodology (e.g., whether a transmission resource of an individual signal is designated to an individual Tx UE by an eNB, or whether an individual Tx UE selects an individual signal transmission resource from a resource pool by itself), a signal format (e.g., the number of symbols occupied in a single subframe by each D2D signal, the number of subframes used for transmission of a single D2D signal), a signal strength from an eNB, a transmit power level of a D2D UE and the like.

For clarity of description, a method for an eNB to directly indicate a transmission resource of a D2D Tx UE in D2D communication is defined as Mode 1. And, a method for a UE to directly select a transmission resource, when a transmission resource region is configured in advance or an eNB designates a transmission resource region, is defined as Mode 2. In case of D2D discovery, a case that an eNB directly indicates a resource is defined as Type 2. And, a case that a UE directly selects a transmission resource from a previously configured resource region or a resource region indicated by an eNB is defined as Type 1.

Moreover, as described above, D2D may be called sidelink, SA may be called Physical Sidelink Control Channel (PSCCH), D2D synchronization signal may be called Sidelink Synchronization Signal (SSS), control channel carrying most basic information, which is transmitted together with SSS before D2D communication, may be called Physical Sidelink Broadcast Channel (PSBCH) or Physical D2D Synchronization Channel (PD2DSCH).

Furthermore, a signal for a specific UE to announce that it is located nearby (here, ID of the specific UE may be included in this signal) or such a channel may be called Physical Sidelink Discovery Channel (PSDCH).

According to Rel. 12 on LTE system, only a D2D communication UE transmits PSBCH together with SSS in D2D, whereby measurement of SSS is performed using DMRS of PSBCH. An out-coverage UE measures DMRS of PSBCH and then determines whether to become a synchronization source by measuring RSRP of this signal and the like.

Moreover, in case of V2X communication, a control channel and a data channel are regarded as existing like D2D. Thus, when there exist a control channel and a data channel associated with the control channel, assume a situation that several vehicles come in and transmit periodic messages. Assuming that a vehicle is a UE, the UE can obtain resources location of the currently transmitted messages by decoding a currently transmitted control channel or performing energy sensing of a data channel And, the UE may further obtain resource locations that will be transmitted by Tx UEs.

Hereinafter, a method of performing beamforming when an eNB performs retransmission based on an Acknowledgement/Negative-Acknowledgement (ACK/NACK) will be described. In particular, embodiments suitable for broadcasting and embodiments applicable to V2X scenarios will be described in detail.

The current LTE system uses an ACK/NACK based HARQ scheme to improve reliability. When a transmitting side transmits, a receiving side checks whether there is an error by decoding data. If it is determined that there is an error, the receiving side transmits a NACK. On the other hand, if it is determined that there is no error, the receiving side transmits an ACK. Accordingly, the transmitting side receives the ACK/NACK. Specifically, upon receiving the NACK, the transmitting side performs retransmission to allow the receiving side to achieve higher reliability. However, in the LTE system, the ACK/NACK based HARQ has been defined only for unicast.

Meanwhile, in the case of a V2X service, broadcasting is preferred. In the case of V2V, a transmitting vehicle uses a broadcasting method to transmit a message on driving to neighboring vehicles. In the case of Vehicle-to-Infrastructure (V2I), an eNB uses a broadcasting method to transmit a message on driving to vehicles in its coverage. The ACK/NACK based HARQ needs to be introduced to broadcasting in a communication system requiring high reliability such as new RAT.

For convenience of description, a device or an eNB that performs transmission and a device that transmits an ACK/NACK are represented as a transmitting side (or transmitting UE) and a receiving side (or receiving UE), respectively.

When the ACK/NACK based HARQ is applied to broadcasting, if receiving sides transmitting NACKs are able to inform a transmitting side where the receiving sides are located with respect to the transmitting side, the transmitting side can provide much higher reliability through beamforming.

Although it is better that the receiving sides directly transmit their location information with respect to the transmitting side, it may be difficult to map ACK/NACK resources for all receiving UEs in different ways since the number of receiving sides is not fixed in the case of broadcasting. In this case, some or all of the receiving UEs share ACK/NACK resources, and it may be also difficult for the receiving UEs to transmit their location information with respect to the transmitting side on the shared resources.

Therefore, the present disclosure proposes a method by which receiving sides, each of which transmits an ACK or NACK, informs a transmitting side where the receiving sides are located with respect to the transmitting side when the ACK/NACK based HARQ is applied to broadcasting. Accordingly, when performing retransmission, the transmitting side can perform beamforming toward a place where receiving sides transmitting NACKs gather based on the collected location information. Hereinafter, the present disclosure will be described based on methods A and B. Not only can each of the methods be implemented independently, but also the methods can be combined for implementation.

<Method A>

Figure 12:
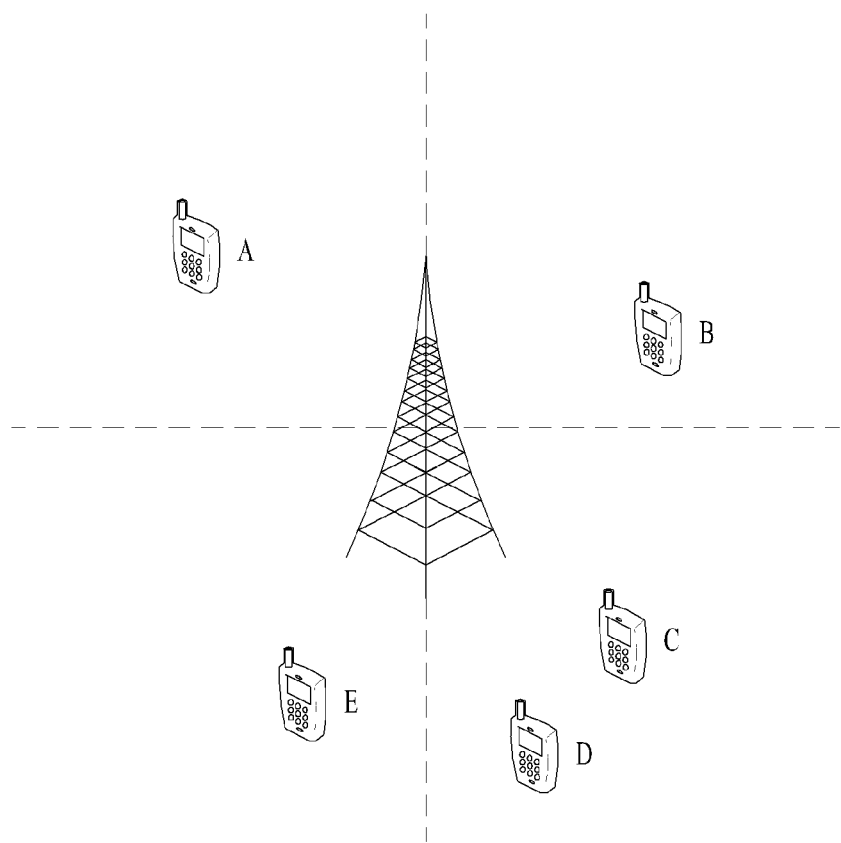
FIG. 12 is a reference diagram for explaining an embodiment of the present disclosure.

FIG. 12 is a reference diagram for explaining a method of designing ACK/NACK resources in resource groups mapped to N areas. Referring to FIG. 12, when ACK/NACK resources are designed, the resources are divided into N groups. The resource groups are mapped one-to-one to N areas relatively located with respect to a transmitting side. For example, if the transmitting side is an eNB and receiving sides are UEs, four areas may be created with respect to the transmitting side as shown in FIG. 12. In this case, each receiving UE transmits an ACK or NACK within an ACK/NACK resource group, which is mapped to an area where each receiving UE is located. The transmitting side may check which resource group each receiving UE uses to transmit the ACK or NACK, perform beamforming suitable for receiving UEs that transmit NACKs, and then perform retransmission. For example, referring to FIG. 12, UE A, UE B, UE C, and UE E transmit ACKs or NACKs within different ACK/NACK resource groups, but UE D transmits an ACK or NACK within the same ACK/NACK resource group as that used by UE C. If only UE C and UE D transmit NACKs, the eNB may perform the beamforming toward an area mapped to the ACK/NACK resource group used by UE C and UE D and then perform the retransmission.

In the present method, ACK/NACK resources are grouped in order to distinguish between areas where receiving UEs are located. However, ACK/NACK sequences are divided into N groups in order to distinguish between N areas. In addition, the value of N may be defined between transmitting and receiving sides, or it may be changed semi-statically through RRC signaling or higher layer signaling. Moreover, the areas where the receiving UEs are located may be divided not only horizontally but also vertically with respect to the transmitting side.

<Method B>

In Method A, a receiving UE should be able to recognize an area where the receiving UE is located with respect to a transmitting side. According to following Methods B-1 to B-10, a receiving UE may transmit an ACK/NACK, and a transmitting side may perform beamforming based thereon.

Method B-1: In the case of V2V, transmitting and receiving UEs may know their location information. Specifically, when transmitting data, a transmitting UE may transmit its location to receiving UEs, and the receiving UEs may use the location information of the transmitting UE and their location information to transmit ACKs or NACKs on ACK/NACK resource groups mapped one-to-one to their relative locations. The transmitting UE checks which resource groups the receiving UEs use to transmit the ACKs or NACKs, performs beamforming based on the relative locations associated therewith, and then performs retransmission.

Method B-2: When a transmitting side transmits data using two or more ports and also transmits Reference Signals (RSs) for the two or more ports, receiving UEs may measure channels based on the RSs for the ports, which are transmitted from the transmitting UE, and then compute the precoding of the ports by assuming rank 1. In this case, the corresponding precoding may be selected from a predefined codebook, and the codewords in the codebook are divided into N groups. The N codeword groups could be interpreted to indicate the relative locations of the receiving UEs with respect to the transmitting side as described in Method A. Thus, the codeword groups can be mapped one-to-one to ACK/NACK resource groups.

After selecting a suitable codeword, each of the receiving UEs transmits an ACK or NACK within an ACK/NACK resource group mapped one-to-one to a codeword group to which the selected codeword belongs. Thereafter, the transmitting side checks which resource groups the receiving UEs use to transmit ACKs or NACKs. Since each resource group is mapped to one codeword group with respect to the ports of the transmitting side, the transmitting side may perform beamforming based thereon and then perform retransmission.

Method B-3: When a transmitting side transmits data using two or more ports and also transmits not only RSs for the ports, which are used for the data transmission, but also RSs for other ports, if receiving UEs measure (estimate) channels of the data ports by applying predetermined precoding to the RS ports, the receiving UEs may measure channels based on RSs for the ports, which are transmitted from the transmitting UE, and then compute the precoding of the ports by assuming rank 1 (in this case, the receiving UEs computes the precoding with respect to channels of the RS ports rather than the channels of the data ports). The corresponding precoding may be selected from a predefined codebook, and the codewords in the codebook are divided into N groups. The N codeword groups could be interpreted to indicate the relative locations of the receiving UEs with respect to the transmitting side as described in Method A. Further, the codeword groups can be mapped one-to-one to ACK/NACK resource groups.

After selecting a suitable codeword, each of the receiving UEs transmits an ACK or NACK within an ACK/NACK resource group mapped one-to-one to a codeword group to which the selected codeword belongs. Thereafter, the transmitting side checks which resource groups the receiving UEs use to transmit ACKs or NACKs. Since each resource group is mapped to one codeword group with respect to the ports of the transmitting side, the transmitting side may perform beamforming based thereon and then perform retransmission.

Method B-4: A transmitting side may transmit data through beam sweeping. That is, using multiple beams, the transmitting side may transmit the same data on different resources. Here, the beam sweeping means a process in which a transmitting side transmits a signal more than once in all available directions. In this case, each receiving UE may measure channel power of the multiple beams used by the transmitting UE and select a beam of the transmitting side, which is most suitable for itself. The beams may be divided into N groups, and the individual beam groups could be interpreted to indicate the relative locations of the receiving UEs with respect to the transmitting side as described in Method A. Thus, the beam groups can be mapped one-to-one to ACK/NACK resource groups.

After selecting the suitable beam, each of the receiving UEs transmits an ACK or NACK within an ACK/NACK resource group mapped one-to-one to a beam group to which the selected beam belongs. Thereafter, the transmitting side checks which resource groups the receiving UEs use to transmit ACKs or NACKs. Since each resource group is mapped to one beam group with respect to the transmitting side, the transmitting side may perform beamforming based thereon and then perform retransmission.

Method B-5: A transmitting side may provide extra beam-related information to receiving UEs in advance. For example, if a different RS is transmitted for each beam, each of the receiving UEs may calculate the best transmission beam using the individual RSs and feed the calculated best transmission beam back to the transmitting side before receiving data. Accordingly, the transmitting side can use the feedback for data transmission. The receiving sides may perform the above feedback process before the data transmission.

Alternatively, after the data transmission, each of the receiving sides may map beam RS groups, which were previously transmitted, to ACK/NACK resource groups one by one and then use an ACK/NACK resource group mapped to a beam RS group to which the most suitable beam RS belongs when transmitting an ACK/NACK.

Method B-6: In Methods B-1 and B-2, the relative location of a receiving UE is calculated with respect to a transmitting side using RS ports used for transmission. However, extra RSs may be designed regardless of transmission in order to allow a receiving UE to calculate its location. When Inventions B-1 and B-2 are applied, each transmitting side may have a different number of ports. As a result, a receiving UE should consider not only a codebook defined for each port and codewords therein but also ACK/NACK resource mapping therewith when calculating its relative location. To reduce this complexity, a fixed number of RS ports (e.g., two ports) may be designed separately regardless of transmission RSs. By doing so, receiving UEs may calculate their relative locations using the same mechanism.

Further, in Method B-3, receiving UEs may be configured to calculate their relative locations based on RSs for a limited number of ports (e.g., two RSs) among RSs used for transmission, instead of using extra RSs that are not related to the transmission.

Method B-7: When Method B is applied, if a transmitting side has both horizontal and vertical antennas, codeword groups in a codebook for horizontal antenna ports may be mapped one-to-one to ACK/NACK resource groups, or codeword groups in a codebook for vertical antenna ports may be mapped one-to-one to the ACK/NACK resource groups. Alternatively, combinations of the codeword groups in the codebook for the horizontal antenna ports and the codeword groups in the codebook for the vertical antenna ports may be mapped one-to-one to the ACK/NACK resource groups.

Method B-8: In Method B, ACK/NACK resources are grouped to distinguish between areas where receiving UEs are located. However, ACK/NACK sequences may be divided into N groups so that N areas can be distinguished from each other.

Method B-9: Although Method B describes how receiving UEs operate, Method B can be applied to a unicast or multicast environment by assuming that there are one or several receiving UEs.

Method B-10: According to Method B, since receiving UEs are able to know their relative locations with respect to a transmitting side, the receiving UEs may transmit ACKs/NACKs to the transmitting side by applying beamforming. For example, assuming that a receiving UE is a vehicle with distributed antennas, the receiving UE may transmit an ACK/NACK by applying beamforming toward a transmitting side (for example, only a specific antenna is configured to be used). Alternatively, the receiving UE may perform the beamforming using some antennas toward the transmitting side in order to transmit the ACK/NACK. When some antennas are used, the power saving effect can be obtained.

Figure 13:
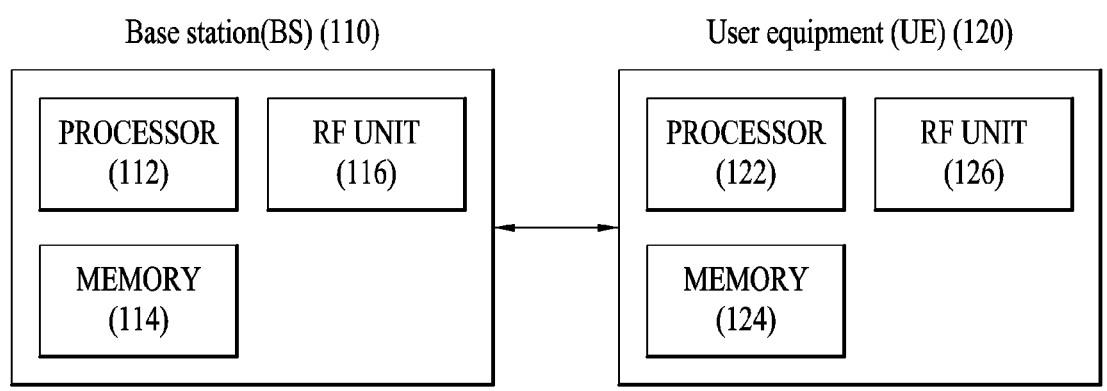
FIG. 13 shows a base station and a user equipment applicable to one embodiment of the present invention.

FIG. 13 illustrates a base station (BS) and a user equipment (UE) applicable to an embodiment of the present invention.

Referring to FIG. 13, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed in the present invention. The memory 114 is connected to the processor 112 and stores various kinds of information related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed in the present invention. The memory 124 is connected to the processor 122 and stores various kinds of information related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

The embodiments of the present invention may be implemented using various means. For instance, the embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

As mentioned in the foregoing description, a method of transmitting a signal for V2X communication in a wireless communication system and apparatus therefor are applicable to various wireless communication systems.

What is claimed is:

1. A method of performing Hybrid Automatic Repeat Request (HARQ) by a Vehicle-to-Everything (V2X) receiving User Equipment (UE) in a wireless communication system, the method comprising:
   receiving beam information related to at least one beam from a V2X transmitting UE;
   reporting information related to a best beam to the V2X transmitting UE based on the information related to the at least one beam;
   receiving a V2X signal broadcasted from the V2X transmitting UE; and
   transmitting an Acknowledgement/Negative-Acknowledgement (ACK/NACK) for the broadcasted V2X signal on an ACK/NACK resource group associated with the best beam to the V2X transmitting UE,
   wherein the ACK/NACK is configured to identify a location area corresponding to a location of the V2X receiving UE from among multiple location areas distinguished for ACK/NACK transmission based on a location of the V2X transmitting UE.

2. The method of claim 1, wherein the ACK/NACK is transmitted in a specific resource region corresponding to the location area corresponding to the location of the V2X receiving UE among resource regions respectively corresponding to the multiple location areas distinguished for the ACK/NACK transmission.

3. The method of claim 1, wherein the ACK/NACK is transmitted using a specific ACK/NACK sequence corresponding to the location area corresponding to the location of the V2X receiving UE among ACK/NACK sequences respectively corresponding to the multiple location areas distinguished for the ACK/NACK transmission.

4. The method of claim 1, wherein the V2X signal is transmitted via at least two ports configured in the V2X transmitting UE, wherein the V2X signal is precoded based on a rank-1 codebook and a channel of the V2X signal is measured, and wherein the ACK/NACK is transmitted on an ACK/NACK resource group corresponding to at least one codeword that is selected from the rank-1 codebook based on a channel measurement value.

5. The method of claim 1, wherein the V2X signal includes data and a reference signal, wherein the data is transmitted via at least two first ports configured in the V2X transmitting UE, wherein the reference signal is transmitted via a second port different from the first ports, wherein the data is precoded based on a rank-1 codebook associated with the second port and a channel of the V2X signal is measured, and wherein the ACK/NACK is transmitted on an ACK/NACK resource group corresponding to at least one codeword that is selected from the rank-1 codebook based on a channel measurement value.

6. The method of claim 1, wherein the V2X signal is transmitted through beam sweeping where multiple beams are used, and wherein the ACK/NACK is transmitted on an ACK/NACK resource group corresponding to a specific beam selected from among the multiple beams based on channel power.

7. The method of claim 1, further comprising:
   receiving reference signals for a predetermined number of ports; and
   determining the location of the V2X receiving UE with respect to the V2X transmitting UE based on the reference signals.

8. The method of claim 1, wherein the V2X signal is transmitted using a horizontal domain antenna and a vertical domain antenna configured in the V2X transmitting UE, and wherein the ACK/NACK is transmitted in an ACK/NACK resource region associated with a codeword corresponding to either or both of the horizontal domain antenna and the vertical domain antenna.

9. A Vehicle-to-Everything (V2X) receiving User Equipment (UE) for performing Hybrid Automatic Repeat Request (HARQ) in a wireless communication system, the V2X receiving UE comprising:
   a transmitter and a receiver; and
   a processor configured to:
   receive beam information related to at least one beam from the V2X transmitting UE;
   report information related to a best beam to a V2X transmitting UE based on the information related to the at least one beam;
   receive a V2X signal broadcasted from the V2X transmitting UE; and
   transmit an Acknowledgement/Negative-Acknowledgement (ACK/NACK) for the broadcasted V2X signal on an ACK/NACK resource group associated with the best beam to the V2X transmitting UE,
   wherein the ACK/NACK is configured to identify a location area corresponding to a location of the V2X receiving UE from among multiple location areas distinguished for ACK/NACK transmission based on a location of the V2X transmitting UE.

10. A method of performing Hybrid Automatic Repeat Request (HARQ) by a Vehicle-to-Everything (V2X) receiving User Equipment (UE) in a wireless communication system, the method comprising:
    receiving, from a V2X transmitting UE, a plurality of V2X signals transmitted through a plurality of transmission beams, wherein the plurality of V2X signals have the same data; and
    transmitting, to the V2X transmitting UE, a response signal for the data based on an Acknowledgement/Negative-Acknowledgement (ACK/NACK) resource group associated with a best transmission beam selected among the plurality of transmission beams.

11. The method of claim 10, further comprising:
    based on the response signal being a NACK signal, receiving a retransmission of the data transmitted through the best transmission beam.

12. The method of claim 10, wherein the plurality of transmission beams are divided into one or more transmission beam groups, and
    wherein the one or more transmission beam groups are mapped one-to-one to one or more ACK/NACK resource groups.

13. The method of claim 10, wherein the best transmission beam is selected among the plurality of transmission beams based on channel power of the plurality of transmission beams through which the plurality of V2X signals is received.

14. A method of performing Hybrid Automatic Repeat Request (HARQ) by a Vehicle-to-Everything (V2X) transmitting User Equipment (UE) in a wireless communication system, the method comprising:
- transmitting, to a V2X receiving UE, a plurality of V2X signals through a plurality of transmission beams, wherein the plurality of V2X signals have the same data; and
- receiving, from the V2X receiving UE, a response signal for the data based on an Acknowledgement/Negative-Acknowledgement (ACK/NACK) resource group associated with a best transmission beam selected among the plurality of transmission beams.

15. The method of claim 14, further comprising:
- based on the response signal being a NACK signal, retransmitting the data through the best transmission beam.

16. The method of claim 14,
- wherein the plurality of transmission beams are divided into one or more transmission beam groups, and
- wherein the one or more transmission beam groups are mapped one-to-one to one or more ACK/NACK resource group.

17. The method of claim 14, wherein the V2X receiving UE selects the best transmission beam among the plurality of transmission beams based on channel power of the plurality of transmission beams through which the plurality of V2X signals is received.

* * * * *